June 5, 1951     C. J. VAN LOON ET AL     2,555,906
TUNABLE AMPLIFIER HAVING A PREDETERMINED BAND PASS
CHARACTERISTIC THROUGHOUT ITS RANGE
Filed July 15, 1946
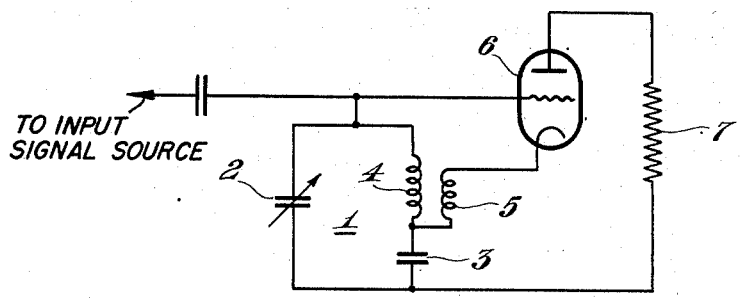
INVENTORS.
CAREL JAN VAN LOON
BERNARDUS DOMINICUS HUBERTUS TELLEGEN
BY
AGENT.

Patented June 5, 1951

2,555,906

UNITED STATES PATENT OFFICE 2,555,906

TUNABLE AMPLIFIER HAVING A PREDETERMINED BAND-PASS CHARACTERISTIC THROUGHOUT ITS RANGE

Carel Jan van Loon and Bernardus Dominicus Hubertus Tellegen, Eindhoven, Netherlands, assignors to Hartford National Bank and Trust Company, Hartford, Conn., as trustee Application July 15, 1946, Serial No. 683,708
In the Netherlands November 11, 1942

Section 1, Public Law 690, August 8, 1946
Patent expires November 11, 1962

2 Claims. (Cl. 179—171)

The United States Patent No. 2,352,956 issued July 4, 1944, relates to a circuit arrangement for the transmission of high-frequency electrical oscillations, which comprises at least one controlled discharge tube and is equipped with an input resonant circuit which is tuned to the frequency of the oscillations to be transmitted, and in which the input resonant circuit is proportioned in such manner that the damping brought about by the losses of the circuit of its own, plus the natural input damping of the discharge tube and the damping exerted on the circuit by preceding parts of the arrangement, is smaller than is necessary in conjunction with the width of the frequency band to be transmitted, the required additional damping being brought about by withdrawing energy from the circuit by means of a negative backcoupling, the backcoupling current or voltage being taken from the circuit(s) of one or more current carrying electrode(s) which are chosen in such manner that the noise current in the output circuit is reduced at the same time on account of the negative backcoupling.

In the circuit arrangement according to the principal patent the value of the negative backcoupling generally depends on the frequency to which the input resonant circuit is tuned. Consequently a variation in tuning involves a variation of the degree of the negative backcoupling and, as a result thereof, of the selectivity of the input resonant circuit.

In the circuit arrangement according to the present invention this disadvantage is obviated by providing means as a result of which the damping of the input resonant circuit remains at least substantially constant in tuning over a wide frequency range. To achieve this constant damping the negative backcoupling is preferably so realised as to be mixed inductive-capacitative. Thus, for instance, the input resonant circuit may be connected on the one hand to the anode and on the other hand to the cathode of the discharge tube, the control-grid being connected to a tapping of the capacity of the circuit and the control-grid circuit or the anode circuit including an inductance coil which is inductively coupled with the resonant circuit.

The same result is obtained when interchanging the connections of the anode and the control grid to the resonant circuit. In the manner stated above the capacitative backcoupling has a damping effect on the resonant circuit. Of course, the inductive backcoupling should also be realised in such manner as to damp the resonant circuit.

The invention will be more fully explained by reference to the accompanying drawing representing, by way of example, one embodiment thereof.

The sole figure represents an amplifying circuit arrangement, in which the resonant circuit 1 is tuned to the frequency of the electrical oscillations to be transmitted. For simplicity the direct voltage supplies have been omitted in the drawing.

The resonant circuit consists of a variable condenser 2, a fixed condenser 3 and an inductance coil 4, the latter being coupled with an inductance coil 5 interposed in the cathode lead of the discharge tube 6. The control-grid of the discharge tube 6 is connected to the top of the circuit 1. To the other end of this circuit is connected the anode of the discharge tube and this across a resistance 7 from which the amplified voltage may be taken. As an alternative a resonant circuit tuned to the signal frequency may, of course, be substituted for the resistance in the present case. The coupling between coils 4 and 5 is so chosen as to damp the circuit 1, whilst the capacitative coupling between anode- and grid-circuit, which is established by the condenser 3, also has a damping effect. In this way a resulting damping of the circuit 1 is obtained, which upon variation of the variable condenser 2 remains constant or substantially constant over a wide frequency range. Consequently the ratio between the loss resistance and the inductance of the circuit, which is determinative for the selectivity, has at least approximately the same value for all frequencies of the tuning range, so that the selectivity does not depend on the tuning frequency.

What we claim is:

1. A circuit arrangement for the transmission of electrical oscillations comprising an electron discharge device having a cathode, a grid and an anode, a resonant input circuit tunable within a prescribed frequency range and provided with a capacitor and an inductor, an output impedance, and a degenerative network formed by a coil in series with a condenser, one end of said output impedance being connected to said anode, the other end of said output impedance being connected through said condenser and said coil in the order named to said cathode, one end of said inductor being connected to said grid and the other end thereof being connected to the junction of said coil and said condenser, one end of said capacitor being connected to said grid and the other end thereof being connected to said other end of said impedance, said coil and said inductor being mutually coupled, said coil having developed thereacross a noise voltage due to cathode noise current flow therein to establish a noise voltage across said input circuit in phase opposition to the noise current flow in said coil thereby to increase the damping of said input circuit without decreasing the signal to noise ratio, said condenser further damping said input circuit to provide a predetermined band-pass characteristic thereto within said prescribed range.

2. A circuit arrangement for the transmission of electrical oscillations comprising an electron discharge device having a cathode, a grid and an anode, a resonant input circuit tunable within a prescribed frequency range and provided with a capacitor and an inductor, an output impedance, and a degenerative network formed by a coil in series with a condenser, one end of said output impedance being connected to said anode, the other end of said output impedance being connected through said condenser and said coil in the order named to said cathode, one end of said inductor being connected to said grid and the other end thereof being connected to the junction of said coil and said condenser, one end of said capacitor being connected to said grid and the other end thereof being connected to said other end of said impedance, said coil and said inductor being mutually coupled, said coil having minimum resistance and having developed thereacross a noise voltage due to cathode noise current flow therein which is applied through the interelectrode capacity of said device to establish a noise voltage across said input circuit in phase opposition to the noise current flow in said coil, thereby to increase the damping of said input circuit without decreasing the signal to noise ratio, said condenser further damping said input circuit to provide a predetermined band-pass characteristic thereto within said prescribed range.

CAREL JAN van LOON.
BERNARDUS DOMINICUS
HUBERTUS TELLEGEN.

REFERENCES CITED

The following references are of record in the file of this patent:

UNITED STATES PATENTS

| Number | Name | Date |
|---|---|---|
| 2,243,401 | Sturley | May 27, 1941 |
| 2,293,262 | Koch | Aug. 18, 1942 |
| 2,315,040 | Bode | Mar. 30, 1943 |
| 2,352,956 | Strutt et al. | July 4, 1944 |